United States Patent
Surkin

[19]

[11] Patent Number: 6,123,498
[45] Date of Patent: Sep. 26, 2000

[54] PIVOTING VEHICLE RACK

[76] Inventor: Uri Surkin, 14001 S. Main St., Los Angeles, Calif. 90061

[21] Appl. No.: 09/032,300

[22] Filed: Feb. 27, 1998

[51] Int. Cl.[7] ....................................................... B60R 9/10
[52] U.S. Cl. ............................ 414/462; 224/509; 224/924
[58] Field of Search ............................ 414/462; 224/509, 224/510, 531, 532, 537, 924, 917.5

[56] References Cited

U.S. PATENT DOCUMENTS

| | | | |
|---|---|---|---|
| 5,094,373 | 3/1992 | Lovci | 224/42.08 |
| 5,454,496 | 10/1995 | Sumida et al. | 224/509 |
| 5,469,997 | 11/1995 | Carlson | 224/521 |
| 5,518,159 | 5/1996 | Deguevara | 224/488 |
| 5,529,231 | 6/1996 | Burgess | 224/502 |
| 5,647,521 | 7/1997 | Burgess | 224/534 |
| 5,664,717 | 9/1997 | Joder | 224/502 |
| 5,730,345 | 3/1998 | Yeckley et al. | 224/505 |
| 5,842,615 | 12/1998 | Goodness | 224/509 |
| 5,853,278 | 12/1998 | Frantz | 414/462 |

Primary Examiner—Douglas Hess
Attorney, Agent, or Firm—Oppenheimer Wolff & Donnelly LLP

[57] ABSTRACT

The vehicle rack mounts equipment to the back end of a vehicle. It includes a hitch connector for attaching the rack to the vehicle. A first horizontal arm attaches to the hitch connector, and a second horizontal arm attaches to the first horizontal arm. A post extends upright from the second arm. In the stored position, the second arm folds against the first arm. In that position, the post is centered behind the vehicle. The second arm can pivot 180° such that the post is beyond the vehicle side. An equipment carrier on top of the post can pivot the equipment 90° so that it does not contact the vehicle side when the arms open. The equipment carrier also can pivot when the rack is closed so that the carrier does not extend too far behind the vehicle.

14 Claims, 8 Drawing Sheets

PIVOTING VEHICLE RACK

BACKGROUND OF THE INVENTION

1. Field of the Invention

The present invention relates to vehicle racks for holding items such as bicycles. The invention has its greatest applicability as an attachment to sport utility vehicles.

2. General Background and State of the Art

Sport utility vehicles (SUVs) and minivans are very popular with vehicle owners especially in the United States. Many have receiving hitches mounted below the rear bumper for receiving a trailer hitch or a sport rack. Sport racks for SUVs and minivans have been designed to carry bicycles, skis, snow boards, motorcycles and other equipment.

Most SUVs and minivans have rear doors. Stationary racks attached to the receiving hitch normally would block the rear door. Therefore, racks have been proposed to move the equipment on the rack out of the way of the rear door. In one example, an upright post, which mounts to a hitch attachment member, pivots rearward to a stop about a horizontal axis. The degree of pivoting leaves sufficient room to open the rear door. Pivoting a heavy, fully loaded rack creates problem, however. Releasing the lock holding the upright post when the vehicle faces up hill can cause the post to pivot backwards very fast. That can damage the rack or the equipment on the rack.

Some racks pivot about a vertical axis. Lovci, U.S. Pat. No. 5,094,373 (1992) and Joder, U.S. Pat. No. 5,664,717 (1997), are examples. Both have a pair of arms. One arm attaches to the receiving hitch and extends to one side of the vehicle. The other arm pivots on the end of the first arm. A vertical post mounts on the second arm, and the structure for mounting equipment mounts to the vertical post. Swinging the second arm relative to the first arm pivots the vertical post, the equipment mount and the equipment itself away from the vehicle's rear door.

When the second arm pivots more than 90° and approaches 180° to the first arm, the equipment may contact the side of the vehicle. Wide items such as bicycles are vulnerable. The art recognizes that one can pivot the equipment about a vertical axis relative to the second arm. Therefore, as the second arm moves to its fully open, 180° position, the equipment can be pivoted 90° and be parallel with the side of the vehicle.

In the Joder patent, the vertical post pivots at its base about the second arm. The second arm locks to the first arm and the vertical post locks to the second arm. Thus, when the vehicle is in motion, the various parts are stationary on the vehicle. Reaching the releasable lock that prevents the vertical post from pivoting is difficult when the rack carries equipment. That is because the equipment usually blocks access to the lock. A bicycle rack made by Surco Products of Los Angeles, Calif., has a remote release that connects to the lock preventing the vertical post from pivoting. That remote release is near the top of the vertical post or near the bicycles themselves. Therefore, the bicycle structure, especially the wheels and spokes, do not block access to the release. A remote release adds complexity and cost to the rack, however.

These racks suffer another problem. The rack's equipment carrier projects far behind the vehicle and can pose a hazard. SUVs are often large themselves, and some large ones barely fit in a garage. Their back ends also can project beyond the back ends of a line of cars in a parking lot. In a parking lot, another driver may strike the rack because it projects farther into the lane between rows of vehicles than the backs of other vehicles.

INVENTION SUMMARY

Solving the previously-discussed problems is the major object of the present invention. In particular, providing a rack that pivots to an open position in a way that the equipment on the rack can be pivoted easily with respect to the rack is one object of the present invention. Thus, one object is to provide a release that is easy to reach but still permits pivoting once releasing occurs. Another object is to disclose and provide a vehicle rack that can pivot easily irrespective of the position of the horizontal supports. These and other objects will be evident from the detailed description of the invention and the drawings.

The vehicle rack of the present invention mounts equipment to a vehicle's rear. It is designed for mounting to a hitch receiver. The rack includes a hitch connector that connects to the vehicle's hitch receiver. The invention includes a pair of horizontal arms. One attaches to the hitch connector, and the other attaches to the first arm. The second arm folds against the first arm when the rack is closed. The second arm can pivot 180° to an open position. A post extends upright from the second arm. In the closed position, the post is centered behind the vehicle, but in the open position, the post is beyond the vehicle side.

An equipment carrier on top of the post pivots the equipment 90° about the top of the post. This 90° pivot moves the equipment out of the way of the side of the vehicle when the arms open. The equipment carrier can pivot when the rack is closed. This pivots the end of equipment carrier closer to the rear of the vehicle so that the carrier does not project too far behind the vehicle.

DETAILED DESCRIPTION OF THE PREFERRED EMBODIMENTS

Figure 1:
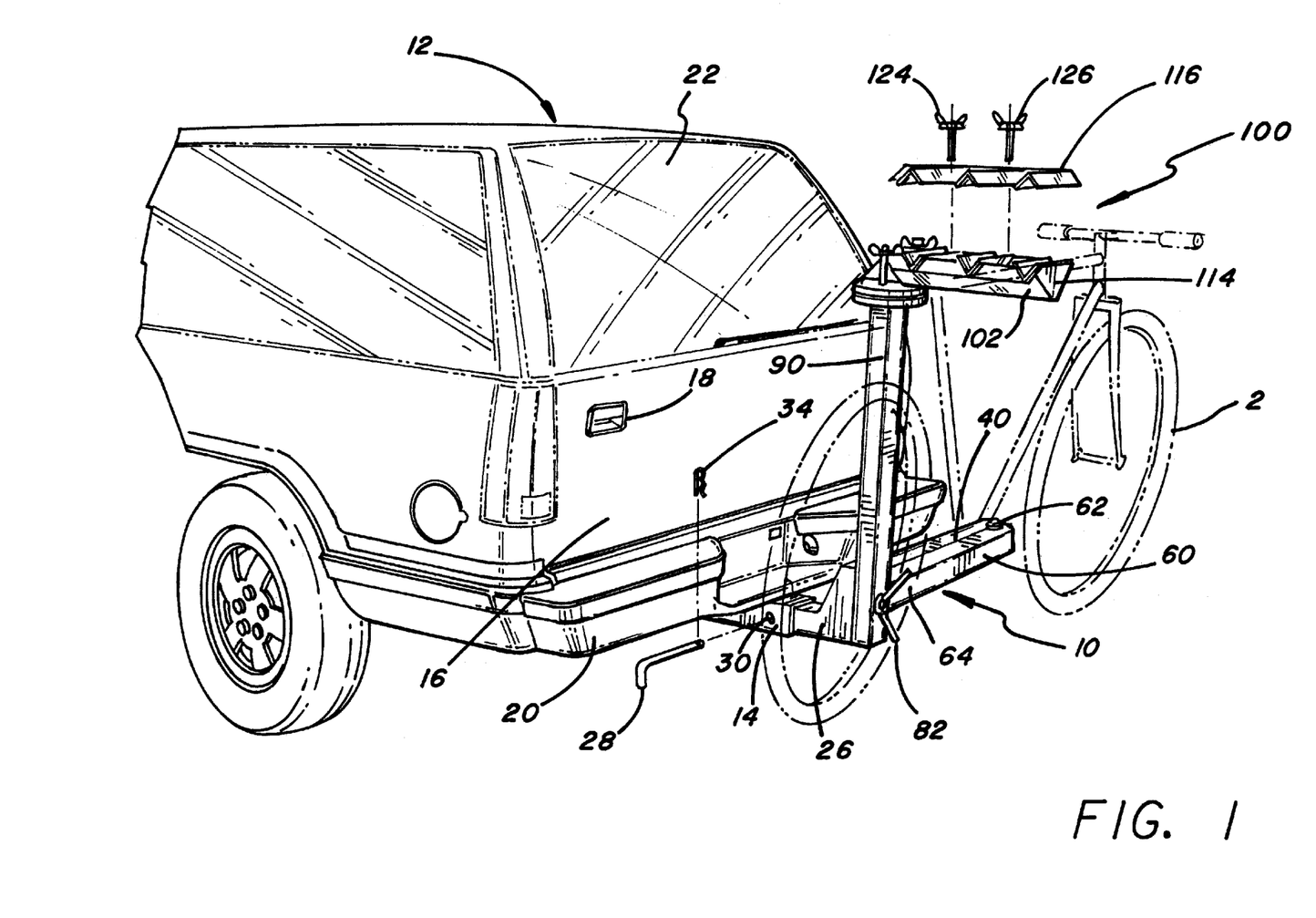
FIG. 1 is a rear perspective view showing the vehicle rack of the present invention in its closed position mounted to the back of a vehicle.

The vehicle rack 10 of the present invention mounts to a receiving hitch on a vehicle. FIG. 1 shows the rear portion of a typical sport utility vehicle (SUV) 12. The SUV itself is not part of the present invention. Furthermore, although FIG. 1 shows the rack mounted to an SUV, it can mount to many other types of vehicles including trucks and vans.

Many SUVs have a receiving hitch as an option. Typically, the receiving hitch 14 (FIGS. 1–3, 4A and 8) attaches to the frame conventionally. Various racks and hitches can connect to such receiving hitches. SUV 12 has a rear door 16. Handle 18 on the door's left side (facing the door) allows the door to open. The door may have a second handle inside the vehicle and may also have a remote release. The door opens to the right above bumper 20, pivoting about a vertical axis on the right side of the vehicle. For full access, many doors open more than 90°. The door also could open down with the glass portion 22 remaining stationary or pivoting up. Some doors pivot upward from the top of the frame surrounding the glass portion 22.

Figure 3:
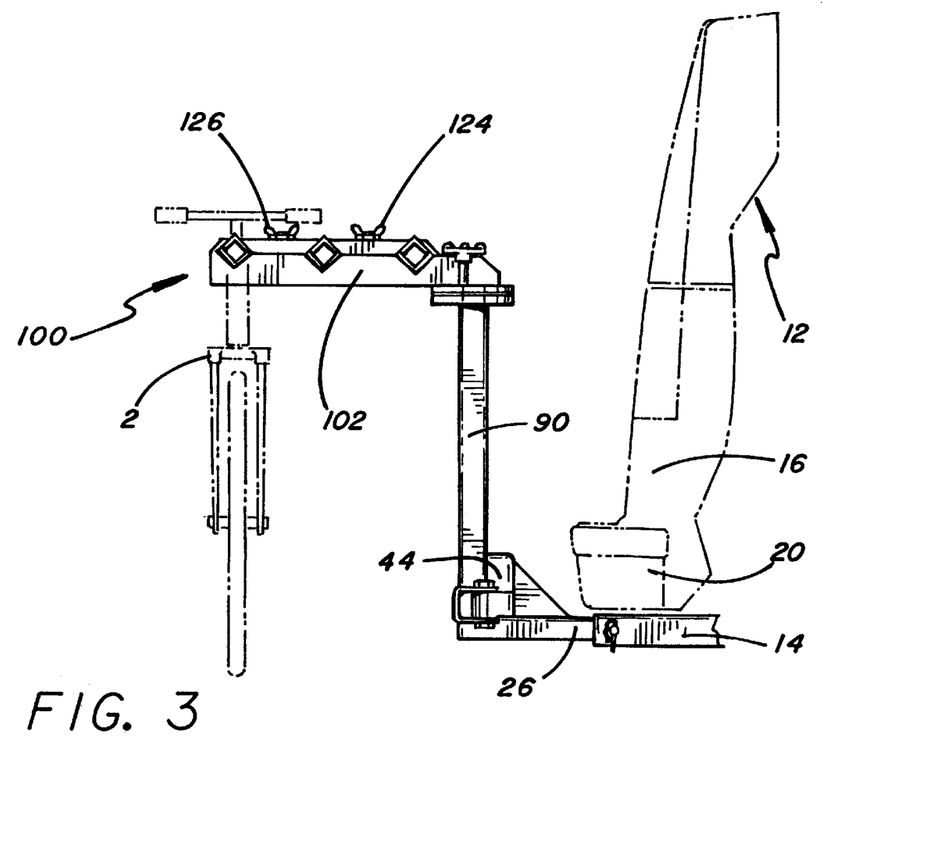
FIG. 3 is a side view of the vehicle rack of the present invention in its closed position shown mounted to the rear of a vehicle.

The vehicle rack of the present invention includes a hitch connector for attaching to the vehicle. FIG. 3 of the exemplary embodiment best shows the hitch connector 26. For strength the hitch connector is preferably 2 inch square (5 cm square) tube steel with a ⅛ inch (3 mm) wall thickness. It is also about 12 in. (30 cm) long. Metric conversions are approximate and rounded. This and other steel parts are painted, galvanized or treated with corrosion resistance coating in the exemplary embodiment. Though they also could be made of stainless steel, that option is much more expensive, and welding stainless steel is more difficult and costly. Although other dimensions are possible, especially the length dimension, the standard vehicle hitch receiver is designed to receive a 2 in. square hitch connector (See FIG. 8).

Figure 4:
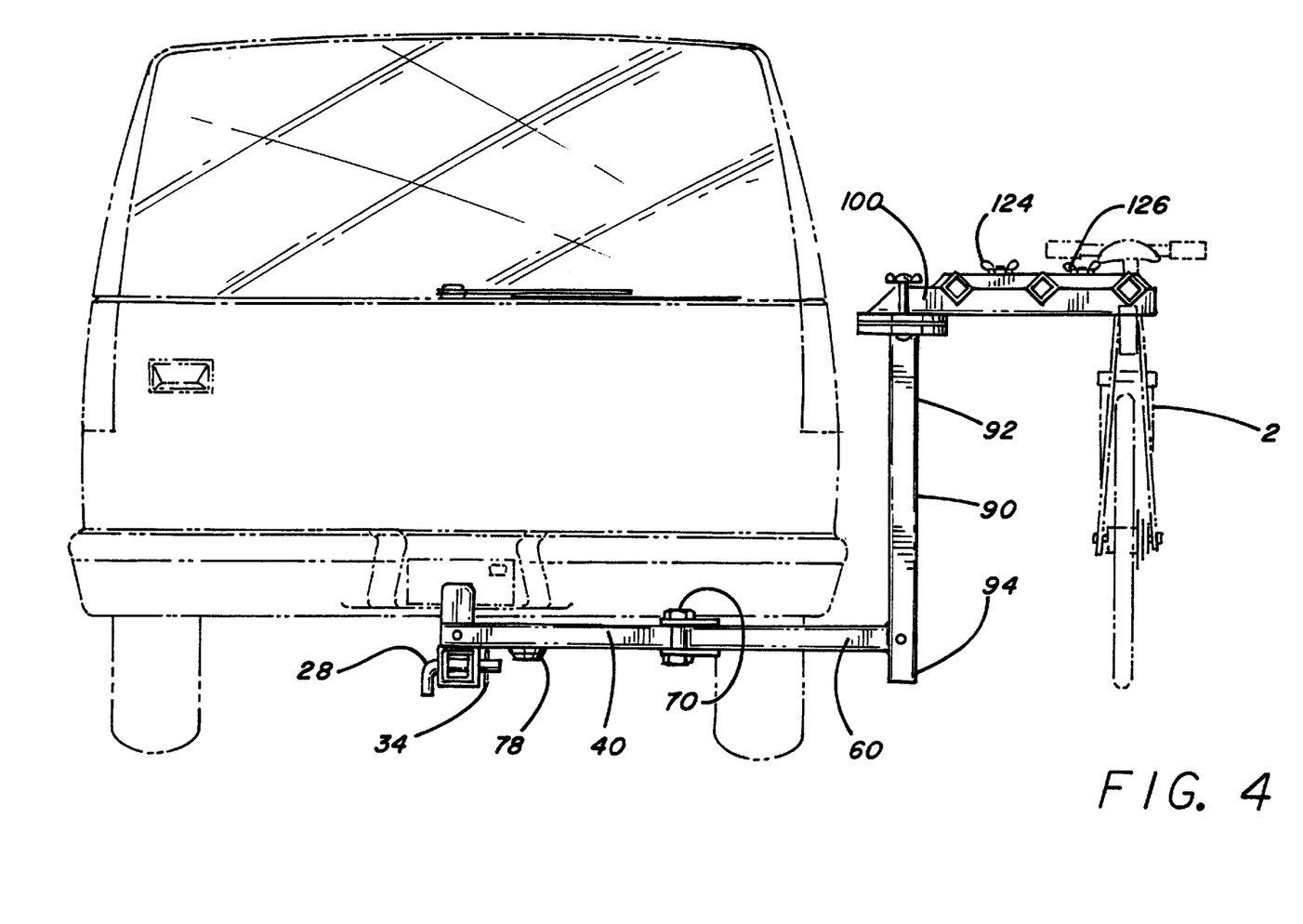
FIG. 4 is a rear view the vehicle rack of the present invention in its fully open position.
Figure 4A:
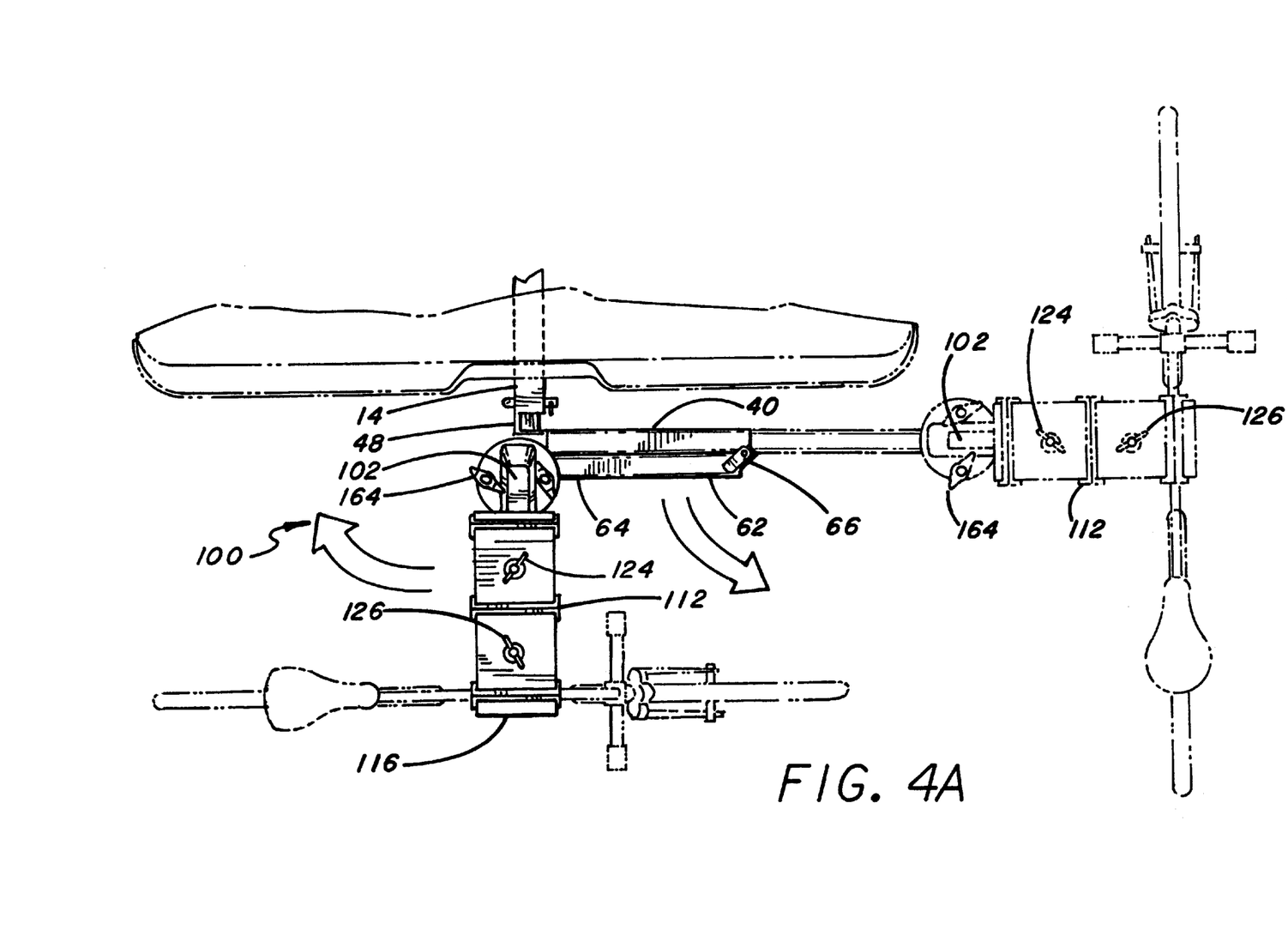
FIG. 4A is a top view the vehicle rack of the present invention showing both the closed and open (phantom) positions.

The hitch receiver 14 can hold the hitch connector 26 in many different ways. In the exemplary embodiment, a pin 28 extents through an opening 30 on the hitch receiver, through aligned openings 32 in the hitch connector (FIG. 8; only one shown) and through another opening on the hitch receiver. A cotter pin 34 secures the pin 28 to prevent removal of the hitch connector (FIGS. 1 and 4).

In the first exemplary embodiment, the hitch connector 26 attaches to a first horizontal arm, which extends to one side of the vehicle from an inside end near the hitch connector to an outside end nearer the side of the vehicle. In the exemplary embodiment, the first horizontal arm 40 (FIGS. 1, 2, 4, 7 and 8) consists of 3 in.×2 in. (7.6 cm×5 cm) steel tube. The wider dimension is in the vertical plane. Again, the wall's thickness is ⅛ in. (3 mm). The first horizontal arm is about 21 in. (53 cm) long, but the length can vary. It must be long enough so that when combined with remaining structure, the rack when opened extends beyond the side of the vehicle. See FIG. 4.

Figure 8:
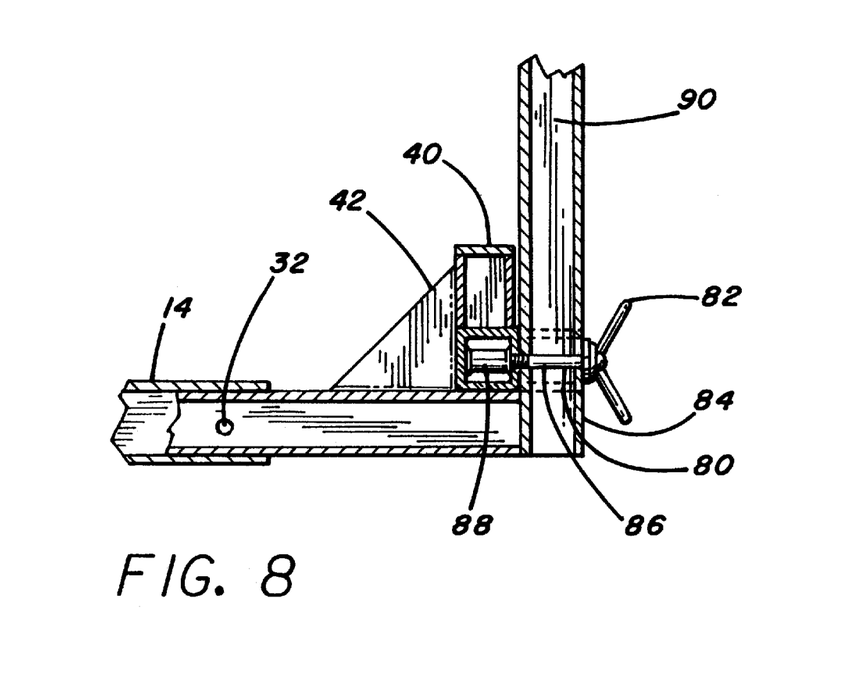
FIG. 8 shows the mechanism in the vehicle rack of the present invention that locks the rack in its closed position.

The inside end 48 of the first horizontal arm 40 is welded to the hitch connector 26 in the exemplary embodiment. The outside end 50 extends more than half way to the vehicle's side. As FIG. 8 shows, a triangular plate 42 also is welded to the hitch connector, to the first horizontal arm and to a small block 44 above the first horizontal arm. See also, FIG. 3. The small block 44 provides additional area to which to weld plate 42. The triangular plate, small block and the welds keep the arm rigid relative to the hitch connector. The small block is 1 in. (2.5 cm) square steel tubing. It can be mounted vertically or horizontally. Vertical mounting presents a side wall for welding to the triangular plate and is preferred.

The triangular plate 42 seals one end of the first horizontal arm. An end cap 46 (FIG. 7) seals the arm's other end. Thus, water cannot enter from the ends of the support. However, the support may have a drainage hole to allow any water to escape. Small block 44 also has a top cover 48 to prevent water from collecting in the small block.

In the first exemplary embodiment, a second horizontal arm 60 is attached to the first horizontal arm. The second horizontal arm 60 has an outside end 62 and an inside end 64. In the exemplary embodiment, the second horizontal arm 60 (FIGS. 1, 4, 5, 7 and 8) is formed from the same steel tubing as the first horizontal arm but is somewhat shorter.

Figure 7:
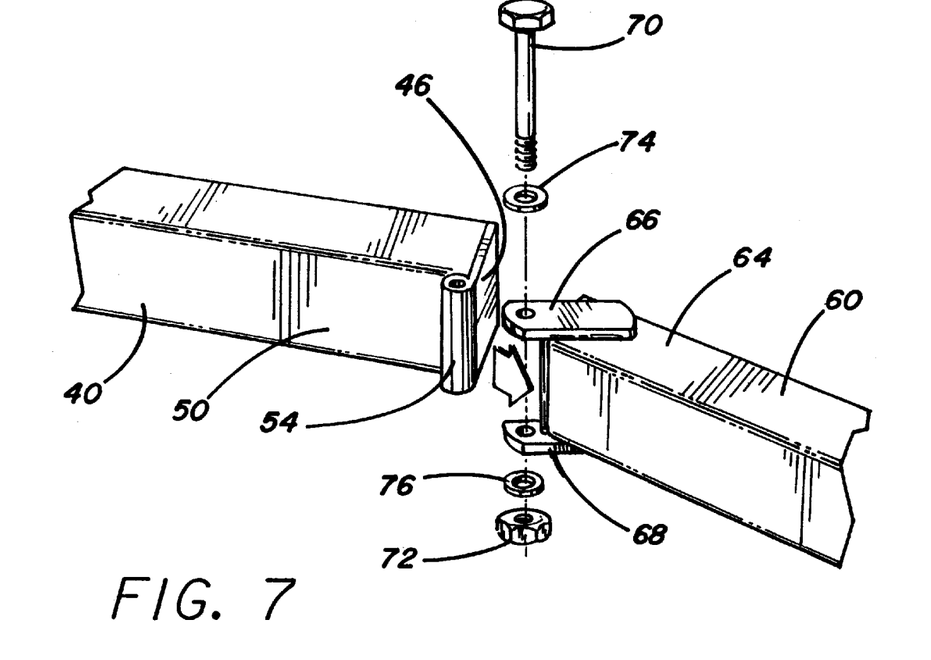
FIG. 7 is an exploded view of the horizontal arms and their pivoting connection.

The outside end 62 of the second horizontal arm pivots on the outside end 50 of the first horizontal arm 40. Although the two horizontal arms can pivot relative to each other in many ways, the first exemplary embodiment uses a pair of hinge plates 66 and 68, which are welded to the second horizontal arm 60 (FIG. 7). Hinge body 54 can be welded to end cap 46 (FIG. 7), or it can be formed integrally as part of the end cap. The hinge body fits between the two hinge plates 66 and 68. Hinge pin 70 extends through aligned opening in each hinge plate and through the hinge body, and a nut 72 secures the hinge pin. Washers 74 and 76 may also be provided.

When the horizontal arms pivot, one horizontal arm would be in a different plane than the other horizontal arm. In the normal, closed position (FIGS. 1 and 2), the inside end 64 of the second horizontal arm 60 extends toward the inside end 48 of the first horizontal arm 40 near the hitch connector 26.

In the first exemplary embodiment, the two horizontal arms are juxtaposed. When they pivot, they remain in the same horizontal plane. They also could be superimposed with a hinge that extends through both. The second exemplary embodiment shows this embodiment.

Figure 9:
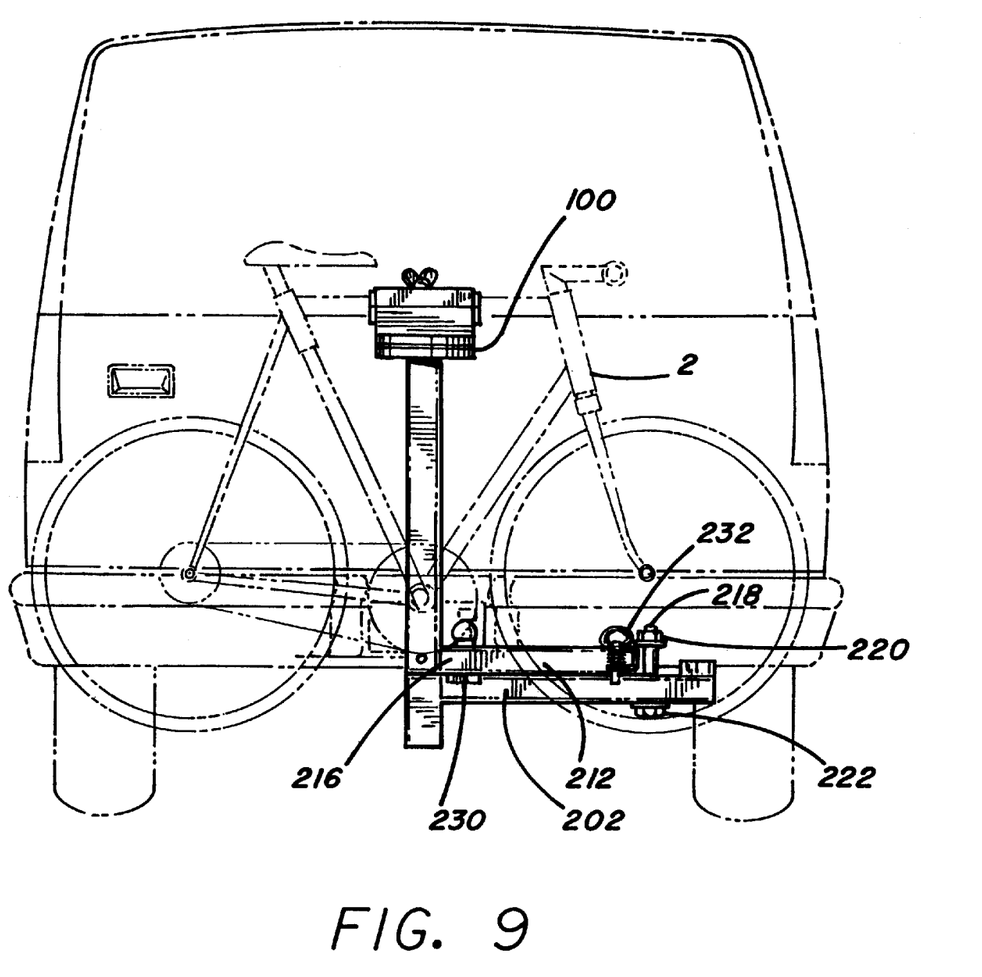
FIG. 9 is a rear view showing a second embodiment of the vehicle rack of the present invention in its closed position mounted to the back of a vehicle.
Figure 10:
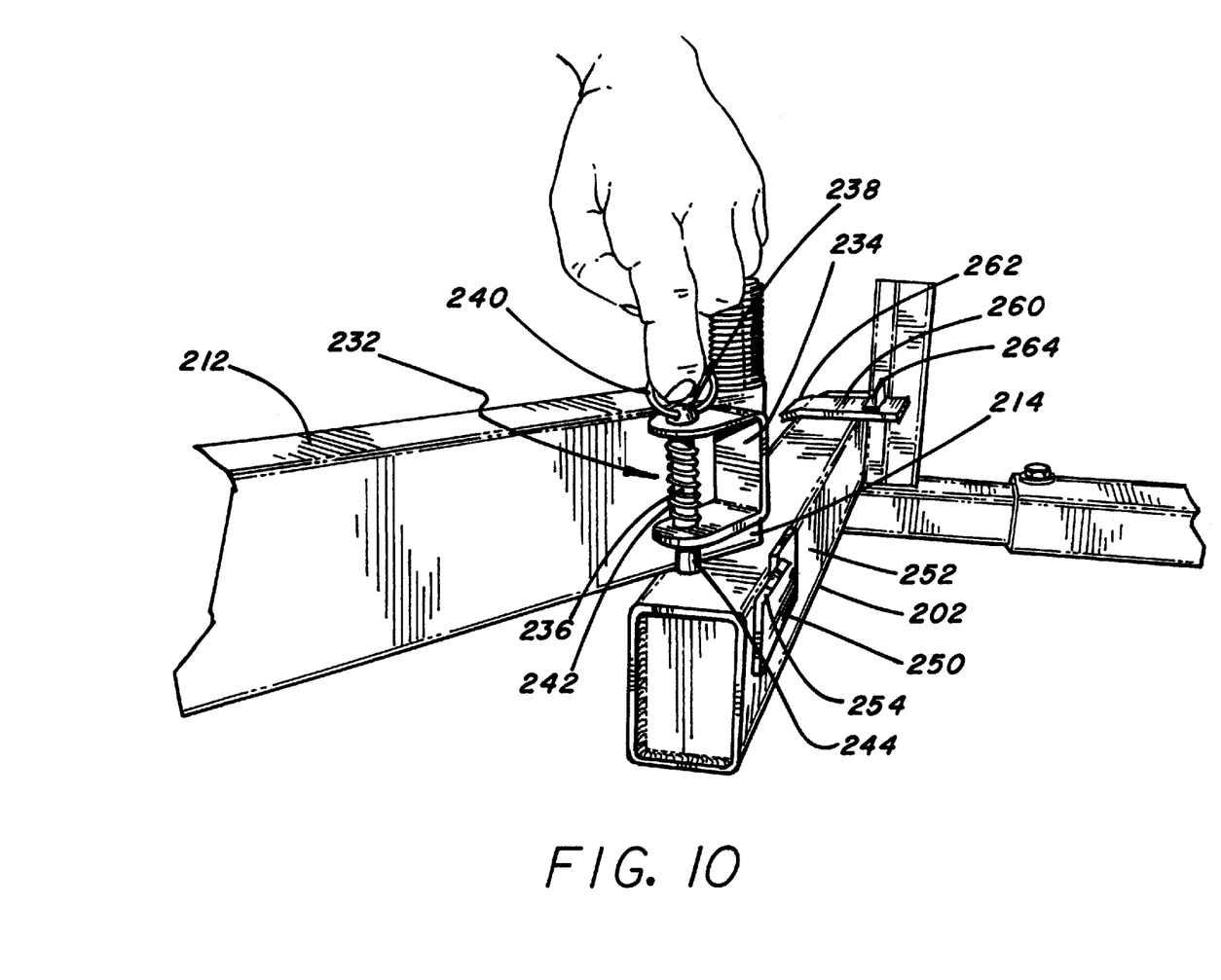
FIG. 10 is a perspective view of a second embodiment of the present invention showing part of the mechanism for holding the vehicle rack in its open position mounted to the back of a vehicle.

Referring to FIGS. 9 and 10, first horizontal arm 202 attaches to the hitch connector. The connection is similar to the connection in the first embodiment and will not be explained further. In this embodiment, the first horizontal arm 202 (FIGS. 9 and 10) also consists of 3 in.×2 in. (7.6 cm×5 cm) ⅛ in. (3 mm) thick steel tube The first horizontal arm is about 26 in. (66 cm) long. As FIG. 9 shows, the first horizontal arm is longer in this embodiment than in the first embodiment.

In the second exemplary embodiment, a second horizontal arm 212 (FIGS. 9 and 10) attaches to the first horizontal arm. The second horizontal arm 212 has an outside end 214 and an inside end 216. In this embodiment, the second horizontal arm 212 (FIGS. 1, 4, 5, 7 and 8) is formed from the same steel tubing as the first horizontal arm but is somewhat shorter, approximately 23 in (58 cm). Horizontal arm pivoting is different in this embodiment than in the first embodiment. Here, a bolt 218 extends vertically through part of the first horizontal arm at the outside end 214 of the second horizontal arm. Bolts 220 and 222 secure the two horizontal arms together at the hinge bolt 218. The hinge structure for hinging two members above and below each other is well known and can vary considerably. Those of ordinary skill can provide different hinges. For example, the drawings of this embodiment show now friction reduction parts, but washers normally would be provided.

The present invention also includes an upright support that extends upright from the inside end 64 of the second horizontal arm 60. The first exemplary embodiment's upright support 90 (FIGS. 1, 3, 4 and 8) is preferably 2 in. square (5 cm square) tube steel. The wall thickness is ⅛ in.

(3 mm), and it is about 34 in. (86 cm) long. Upright support 90 is welded to the outside end of the second horizontal arm 60. Of the upright support's 34 in. length, about 29 in. (74 cm) is the upper region 92, which extends above the second horizontal arm, 2 in. (5 cm) is a short stub 94 that extends below the second horizontal arm, and the portion of the upright support that is welded requires the remaining 3 in. (8 cm).

The upright support must be long enough so that any equipment such as bicycle 2 (FIGS. 1 and 4) does not strike the ground. Therefore, the upright support's length must account for the remaining structure that holds equipment, the height of the equipment carried, the distance that the hitch connector 26 is above the ground and the effect of hills on the equipment rack's attitude.

A lock normally holds the horizontal arms in the closed position. The lock in the first exemplary embodiment is a wing bolt 80 (FIGS. 1 and 8). The wing bolt extends through aligned openings 84 and 86 in the upright support 90 (FIG. 8). Wing bolt 80 is threaded and engages a nut 88 inside small block 44. Alternately, the small block could have a threaded opening to engage the wing bolt's threads.

A short plate 78 (FIG. 4) may extend outward from the bottom of the first horizontal arm 50 under part of the second horizontal arm 60. The short plate frictionally engages the bottom of the first horizontal arm. When the vehicle is parked with the rack facing down a hill, unlocking the wing bolt could allow gravity to pivot the second horizontal arm relative to the first horizontal arm very fast. Friction from the short plate 78 slows the start of the pivoting and allows one to stop the rapid pivoting after one removes the wing bolt 80. Plate 78 also could be made rough or have friction-adding material to its upper surface to provide added friction to the second horizontal arm.

The second exemplary embodiment can use a wing bolt, but FIG. 9 shown no bolt. Instead, spring-loaded pin locks secure the arms together. In this embodiment, a first spring lock 230 (FIG. 9) mounts on the inside end 214 of the second horizontal arm 212. A second spring lock 232 (FIG. 9) mounts on the second horizontal arm's outside end 216. Both locks share the same construction, and FIG. 10 shows a better view of one of the locks. Therefore, only that lock, 232, is described in detail. Lock 232 includes a C-shaped bracket 234 welded or other attached to the second horizontal arm 212. A cylindrical pin 236 extends through aligned openings in the bracket. The pin has a head 238 above the bracket, and a ring 240 attaches to the head. The ring is large enough for a person to put his or her finger through the ring for pulling up on the pin. A spring 242 pushes the pin down so that the pin's bottom 244 extends below the bracket.

When the second horizontal arm is in its extended position, the pin 236 is past bracket 250. The bracket is welded to the first horizontal arm as FIG. 10 shows. The bracket has two regions that extend above the top of the first horizontal arm. The inside region 252 is vertical and acts as a stop limiting pivoting of the second horizontal arm. The other region 254 is angled to the rear to create a short ramped surface or locking wall. As the bottom 244 of pin 236 strikes the ramped surface, the surface pushes the pin upward. When the pin passes the ramped surface, it clicks down. This acts to lock the second horizontal arm in its extended position. This can be an important feature. Especially when the vehicle faces up a hill, the second horizontal arm will tend to pivot backward to that it is parallel to the slope of the hill. Locking the first and second horizontal arms together minimizes the risk of this occurring. Plate 250 also may have an addition vertical region beyond the angled region 254 for blocking rotation of the second horizontal arm farther than its extended position.

The first lock 230 operates in the same manner as the second lock. For the first lock, a short ramping plate 260 (FIG. 10). The plate has a ramping surface 262. As the second horizontal arm rotates to the closed position, the bottom of the pin of lock 232 rides on the ramping surface and partially compresses the spring of that lock. Further rotation of the arm causes the bottom of the pin to reach a strike surface 264. That surface is triangular with a sloped surface facing toward the approaching pin that terminates in a vertical wall or locking wall. Forcing the pin over the strike surface locks the pin behind the vertical wall. This holds the second horizontal arm in its closed position. To open the second horizontal arm toward its extended position, one pulls up on the ring of lock 230 and pulls the second horizontal arm backward until the pin is in front of the strike surface 264.

As FIG. 9 shows, parts of a bicycle 2 may block access to inside lock 230. Because outside lock 232 is accessed only when the rack is in its open configuration, the bicycle does not interfere with that lock. To provide easier access to the inside lock, one may mount a release elsewhere on the rack and connect that release by cable to the pin of lock 230.

Figure 6:
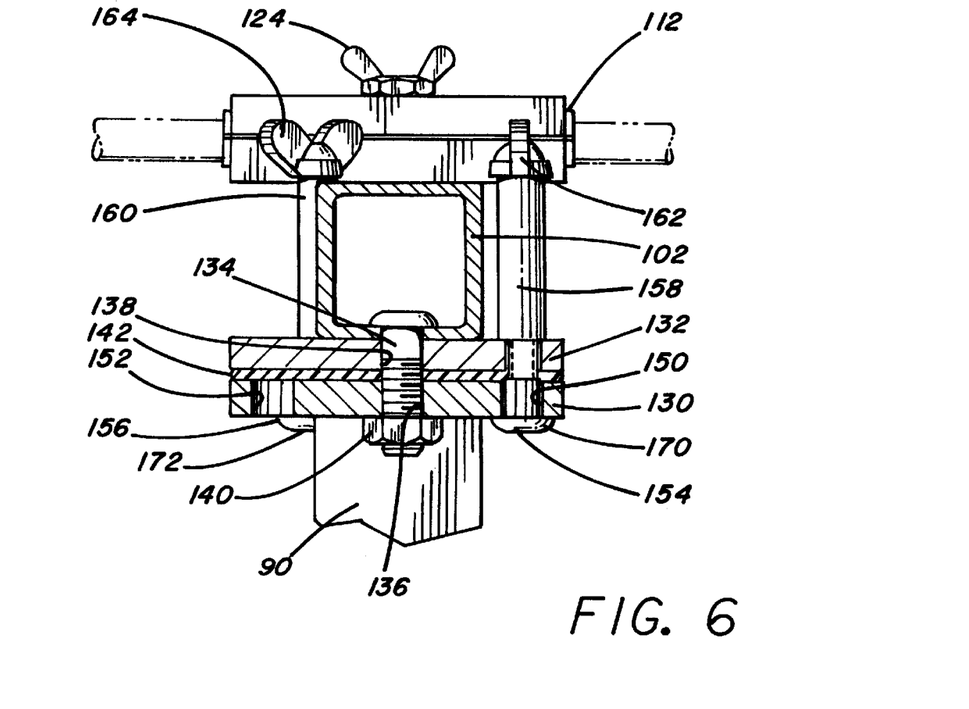
FIG. 6 is a sectional view of the vehicle rack of the present invention taken through plane 6—6 in FIG. 2.

An equipment carrier attaches for pivoting about a generally vertical axis to the top portion of the upright support. The equipment carrier 100 of the exemplary embodiment (FIGS. 1, 3, 4, 6 and 7) carries bicycles such as bicycle 2. Its connection to the upright support is discussed below. As FIGS. 6 and 7 show, the carrier has a bottom brace 102. It also is formed of 2 in. square steel tubing, and its ends are sealed to prevent water from collecting inside.

An equipment clamp 104 mounts on the bottom brace 102. The equipment clamp 104 comprises a lower clamp 106 that is welded to the top of the bottom brace 102. The lower clamp is formed of sheet steel. Small triangular cut-outs 108 are formed along the edges of the lower clamp, and the edges are bent upward in a press or other metal-working machine to form side walls 110. An angle jaw 112 extends beyond the side walls 110 and is welded to the side walls at the triangular cut-outs 108. The cut-outs now face upward because of the bend that forms the side walls.

An extension 114 of the sheet steel that forms the lower clamp is bent to seal the end of the bottom brace. In the exemplary embodiment, the extension 114 is triangular (FIG. 1) for ease of construction and to eliminate sharp angles. The triangular surface also can mount a reflector for added visibility.

The equipment clamp 104 also has an upper clamp 116, which is very similar to the lower clamp 106. The upper clamp also has triangular cut-outs in the side walls 120. An angle jaw 122 extends between the cut-outs. As the drawing show, the upper and lower angle jaws 112 and 122 can close on each other. The lower clamp 106 also has a pair of threaded openings (not shown) that face up. Bolts 124 and 126 with a wing cap thread into the threaded openings and clamps the upper clamp to the lower clamp.

When the equipment claim carries a bicycle 2, the user removes the upper clamp 116 and rests the horizontal strut 4 of a bicycle in one of the angled jaws 108. If carrying more than one bicycle, the user places the other bicycle struts in other angled jaws. The user then places the upper clamp 116 over the lower clamp 106 such that the angled jaws 118 are above the bicycle strut 4. Bolts 124 and 126 then are tightened so that the two clamps 106 and 116 securely hold the bicycle.

In the exemplary embodiment, the equipment carrier is horizontal. It also can be angled upward by providing a bend in the bottom brace. An upward angle raises the bicycles. This may be especially important for the outside-most bicycle, which would have the greatest tendency to strike the ground when the vehicle first encounters a hill or driveway.

For access to the rear door 16 of vehicle 12, the user opens the rack. First, the user unlocks the rack by releasing wing bolt 80. Then, the second horizontal arm is pivoted counterclockwise about hinge 70. If the carrier 100 were fixed on the upright support 90, the bicycle front or rear would hit the side of the vehicle. Therefore, the carrier pivots to the FIG. 4 orientation.

To accomplish pivoting, the present invention uses a lower plate fixed to the upper end of the upright support, and an upper plate attached to the upright support and mounted for sliding on the lower plate. In the exemplary embodiment, lower plate 130 (FIGS. 5 and 6) is welded to the top 92 of the upright support 90. An upper plate 132 mounts on the lower plate. Both plates in the exemplary embodiment are tamped steel, 5½ in. (14 cm) in diameter and ¼ in. (6 mm) thick. A bolt 134 extends through opening 136 and 138 in the plates and through an opening in the bottom brace 102 (FIG. 6). Finally, a nut 140 secures the plates together. Since one plate will pivot on the other, the nut cannot be too tight, but it must be tight enough to prevent the upper plate from wobbling on the lower plate. Also, for added rigidity between the upper plate 132 and the equipment carrier, the top of the upper plate 132 is welded to the bottom of the brace 102. A sheet of friction reducing plastic 142 is mounted between the top and bottom plates to make pivoting the top plate relative to the bottom plate easier. The space between the two plates can be lubricated.

Figure 5:
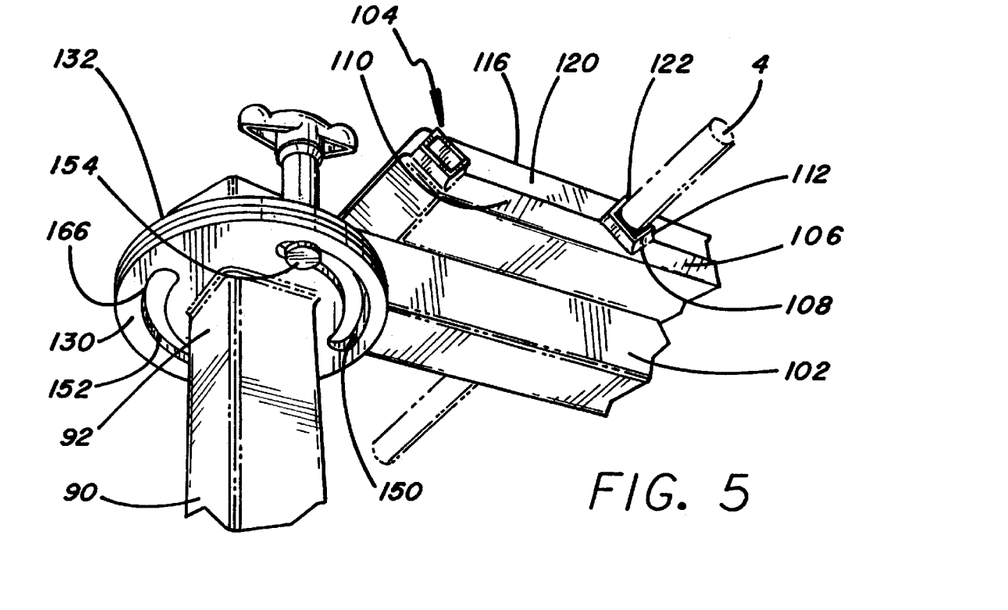
FIG. 5 is a perspective view of a portion of the vehicle rack of the present invention.

The bottom plate 130 has a pair of diametrically opposed, arcuate guide slots 150 and 152 (FIGS. 5 and 6). Each extends in a 90° arc. Spring loaded bolts 154 and 156 extend upward through the guide slots, through the upper plate 132 and through sleeves 158 and 160. The sleeves are welded to the top of the upper plate 132. A spring (not shown) within each sleeve urges the bolt 150 and 152 upward. The top of each bolt is treaded, and a threaded wing nuts 162 and 164 captures the respective bolt threads. The sleeves are sufficiently tall to raise the wing nuts above the top of brace 102 so that the brace does not interfere with the wing nuts. The ends of each guide slot 150 and 152 may have a groove (only one groove 166 is shown in FIG. 5). These grooves capture the heads 170 and 172 of the bolts and act as stops for bolt movement in the guide slots.

The bolt/guide slot arrangement allows pivoting of the upper plate and the equipment carrier about the lower plate and upright support. When one loosens the wing nuts 162 and 164, the caps 170 and 172 of the bolts 154 and 156 release the bottom of the bottom plate 130. One then can pivot the top plate 132 and the equipment carrier 100 up to 90°. The pivoting slides the bolts 154 and 156 from one end of their arcuate slot 150 or 152 to the slots' other end. This pivoting positions the equipment carrier from the orientation in FIGS. 1, 2 and 4 to the FIG. 4 orientation. If the user opens the rack to the FIG. 4 position without first pivoting the equipment carrier about the upright support 90, part of the bicycle 2 would contact the side of the vehicle. This either could damage the vehicle or could prevent the user from opening the rack fully.

Tightening the wing nuts 162 and 164 locks the upper plate 132 and lower plate 130 together. This prevents further pivoting of the equipment carrier relative to the rest of the rack.

Having the structure that allows pivoting to be near the top of the rack provides added benefits. First, access to lock and unlock pivoting is at or above the equipment. Thus, it is above waist high for the average user. He or she does not have to bend down to pivot the equipment. Also, having the release in the higher position prevents the bicycles or other equipment from blocking access to the release. When the release is at the level of the horizontal arms, it collects road dirt, snow and ice more easily.

Figure 2:
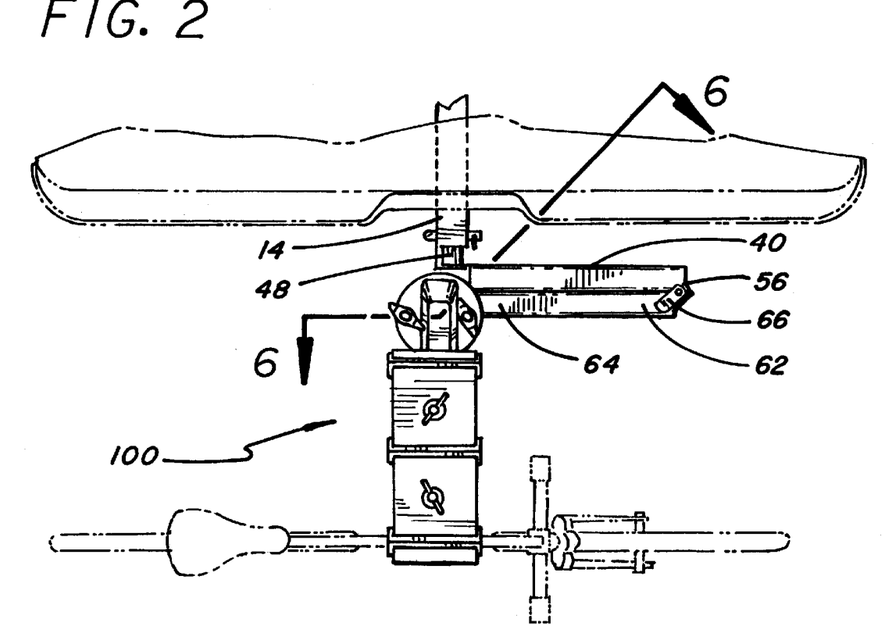
FIG. 2 is a top, plan view of the vehicle rack of the present invention in its closed position shown mounted to the rear of a vehicle.

The pivoting mechanism of the present invention has other advantages. As FIGS. 2 and 3 show, the rack projects significantly behind the vehicle irrespective of whether the rack carries any equipment. Many drivers who use the rack frequently but not daily will tend to leave the rack attached to the vehicle. The driver can pivot the equipment carrier 90° even when the rack is in its closed position. Thus, when not carrying equipment, the carrier is pivoted to be parallel with the horizontal arms. In that position, it projects much less behind the vehicle.

To prevent theft of the rack or the equipment being carried, many of the connectors can have security fittings. For example, a pad lock (not shown) may hold pin 28 (FIGS. 1 and 4) in place. Locks may be provided for the wing bolt 80, the hinge 70 and the wing nuts 124 and 126. Bolt 134 (FIG. 6) is not accessible when the rack is attached to a vehicle because the bolt is at the top, inside upright support 90. A thief cannot reach that bolt because the distance through the upright support is much greater than the distance from the ground to the bottom of the upright support.

While the specification describes particular embodiments of the present invention, those of ordinary skill can devise variations of the present invention without departing from the inventive concept.

I claim:

1. A vehicle rack for mounting equipment to a vehicle, the vehicle rack comprising:

a) a hitch connector for attaching to the vehicle;

b) an upright support having a lower end and an upper end, the upright support member extending upright from the hitch connector;

c) an equipment carrier attached for pivoting about a generally vertical axis to the upper end of the upright support; and d) a lower plate fixed to the upper end of the upright support, an upper plate having one side attached to the equipment carrier and the other side pivotally mounted to the lower plate.

2. The vehicle rack of claim 1 further comprising a guide on one of the plates and a guided member on the other plate extending to the guide, the guide limiting the extent that the upper and lower plate pivot with respect to each other.

3. The vehicle rack of claim 1 further comprising a guide lock on the guided member for securing the guided member in the guide and preventing the upper and lower plates from pivoting with respect to each other.

4. The vehicle rack of claim 1 wherein the hitch connector further comprises:

a) a hitch attaching member;

b) a first horizontal arm attached to the hitch attaching member and extending to at least one side of the vehicle from an inside end near the hitch attaching member to an outside end nearer the side of the vehicle;

c) a second horizontal arm attached to the first horizontal arm, the second horizontal arm having an outside end and an inside end, the outside end of the second horizontal arm being pivotally mounted to the outside end of the first horizontal arm and the inside end of the second horizontal arm extending toward the inside end of the first horizontal arm when the vehicle rack is in a closed condition; and wherein the upright support extending upright from the inside end of the second horizontal arm.

5. The vehicle rack of claim 4 wherein the second horizontal arm is mounted at the same horizontal level as the first horizontal arm.

6. The vehicle rack of claim 5 further comprising a hinge mounted on one of the horizontal arms and a pin mounted on the other horizontal arm and extending through the hinge.

7. The vehicle rack of claim 4 wherein the second horizontal arm is mounted above the first horizontal arm.

8. The vehicle rack of claim 7 further comprising a hinge pin extending through the first horizontal arm and second horizontal arm to permit the horizontal arms to pivot with respect to each other.

9. The vehicle rack of claim 7 further comprising an outside lock mounted on the outside end of the second horizontal arm, the first horizontal arm and the second horizontal arm each having a top and bottom surface, the outside lock having a pin with a bottom portion extending below the top of the first horizontal arm, the pin being spring biased downward, a locking wall extending above the top of the first horizontal arm, the outside lock being mounted such that the pin can be positioned on either side of the locking wall.

10. The vehicle rack of claim 7 further comprising an inside lock mounted on the inside end of the second horizontal arm, the first horizontal arm and the second horizontal arm each having a top and bottom surface, the inside lock having a pin with a bottom portion extending below the top of the first horizontal arm, the pin being spring biased downward, a locking wall extending above the top of the first horizontal arm, the inside lock being mounted such that the pin can be positioned on either side of the locking wall.

11. The vehicle rack of claim 10 further comprising a ramp extending below the top of the first horizontal arm and positioned to contact the bottom portion of the inside lock when the second horizontal arm moves to a position in which the inside end of the second horizontal arm is adjacent the inside end of the first horizontal arm.

12. A vehicle rack for mounting equipment to a vehicle, the vehicle rack comprising:

a) a hitch connector for attaching to the vehicle;

b) an upright support having a lower end and an upper end, the upright support member extending upright from the hitch connector;

c) an equipment carrier attached for pivoting about a generally vertical axis to the upper end of the upright support;

d) a hitch attaching member;

e) a first horizontal arm attached to the hitch attaching member and extending to at least one side of the vehicle from an inside end near the hitch attaching member to an outside end nearer the side of the vehicle;

f) a second horizontal arm attached to the first horizontal arm, the second horizontal arm having an outside end and an inside end, the outside end of the second horizontal arm being pivotally mounted to the outside end of the first horizontal arm and the inside end of the second horizontal arm extending toward the inside end of the first horizontal arm when the vehicle rack is in a closed condition; wherein the second horizontal arm is mounted above the first horizontal arm; and wherein the upright support extending upright from the inside end of the second horizontal arm;

g) a hinge pin extending through the first horizontal arm and second horizontal arm to permit the horizontal arms to pivot with respect to each other; and h) an outside lock mounted on the outside end of the second horizontal arm, the first horizontal arm and the second horizontal arm each having a top and bottom surface, the outside lock having a pin with a bottom portion extending below the top of the first horizontal arm, the pin being spring biased downward, a locking wall extending above the top of the first horizontal arm, the outside lock being mounted such that the pin can be positioned on either side of the locking wall.

13. The vehicle rack of claim 12 further comprising an inside lock mounted on the inside end of the second horizontal arm, the first horizontal arm and the second horizontal arm each having a top and bottom surface, the inside lock having a pin with a bottom portion extending below the top of the first horizontal arm, the pin being spring biased downward, a locking wall extending above the top of the first horizontal arm, the inside lock being mounted such that the pin can be positioned on either side of the locking wall.

14. The vehicle rack of claim 13 further comprising a ramp extending below the top of the first horizontal arm and positioned to contact the bottom portion of the inside lock when the second horizontal arm moves to a position in which the inside end of the second horizontal arm is adjacent the inside end of the first horizontal arm.

* * * * *